United States Patent [19]
ul Azam et al.

[11] Patent Number: 5,878,353
[45] Date of Patent: *Mar. 2, 1999

[54] RADIO FREQUENCY COMMUNICATION DEVICE INCLUDING A MIRRORED SURFACE

[75] Inventors: Zafar ul Azam, Barrington; Anthony John Bogusz, Harwood Heights; Andrew Scott Lundholm, Streamwood, all of Ill.

[73] Assignee: Motorola, Inc., Schaumburg, Ill.

[ * ] Notice: The term of this patent shall not extend beyond the expiration date of Pat. No. 5,566,224.

[21] Appl. No.: 729,964

[22] Filed: Oct. 15, 1996

Related U.S. Application Data

[63] Continuation of Ser. No. 298,474, Aug. 29, 1994, Pat. No. 5,566,224.

[51] Int. Cl.$^6$ ........................................................... H04Q 7/32
[52] U.S. Cl. ................................................ 455/550; 455/566
[58] Field of Search .................................. 455/550, 556, 455/566, 569, 575, 30; 359/557–839, 841

[56] References Cited

U.S. PATENT DOCUMENTS

| | | |
|---|---|---|
| 3,950,701 | 4/1976 | Matuoka et al. . |
| 4,447,808 | 5/1984 | Marcus . |
| 4,588,267 | 5/1986 | Pastore ..................................... 350/600 |
| 4,706,273 | 11/1987 | Spear et al. . |
| 4,870,676 | 9/1989 | Lewo . |
| 4,882,565 | 11/1989 | Gallmeyer ............................... 359/839 |
| 5,014,046 | 5/1991 | Minami . |
| 5,037,182 | 8/1991 | Groves et al. ........................... 359/630 |
| 5,048,077 | 9/1991 | Wells et al. . |
| 5,048,927 | 9/1991 | Inque et al. .............................. 359/618 |
| 5,086,510 | 2/1992 | Guenther et al. . |
| 5,191,602 | 3/1993 | Regen et al. . |
| 5,276,729 | 1/1994 | Higuchi et al. .......................... 455/564 |
| 5,303,205 | 4/1994 | Gauthier . |
| 5,319,805 | 6/1994 | Holcomb et al. . |
| 5,416,313 | 5/1995 | Larson et al. . |
| 5,475,366 | 12/1995 | Van Lente et al. . |
| 5,479,157 | 12/1995 | Suman et al. . |
| 5,479,476 | 12/1995 | Finke-Anlauff ......................... 455/550 |
| 5,566,224 | 10/1996 | Ul Azam et al. ........................ 455/566 |
| 5,572,573 | 11/1996 | Sylvan et al. ........................... 455/556 |

FOREIGN PATENT DOCUMENTS

| | | |
|---|---|---|
| 038101 | 1/1990 | European Pat. Off. . |
| 842212 | 7/1960 | United Kingdom . |
| 984859 | 1/1964 | United Kingdom . |
| 984849 | 3/1965 | United Kingdom . |
| 1401356 | 7/1975 | United Kingdom . |
| WO95/19598 | 7/1995 | WIPO . |

OTHER PUBLICATIONS

"Alphanumeric Rear View Mirror Display," Technical Development, vol. 18, Mar. 1993, Motorola, Inc. pp. 138–139.

Ede, B.J., Search Report for GB 9516619.5, Nov. 3, 1995, pp. 1–2.

*Primary Examiner*—Dwayne D. Bost
*Assistant Examiner*—William G. Trost
*Attorney, Agent, or Firm*—Mark D. Patrick

[57] ABSTRACT

A RF communication device (100, 200, 300) employs a mirrored surface (109, 209, 309). The mirrored surface (109, 209) contains a display area (108, 208) that may be used to output operational information of the RF communication device (100, 200), such as signal strength and status information, to a user.

18 Claims, 3 Drawing Sheets

RADIO FREQUENCY COMMUNICATION DEVICE INCLUDING A MIRRORED SURFACE

This application is a continuation of Ser. No. 08/294,474 filed Aug. 29, 1994, now U.S. Pat. No. 5,566,224.

BACKGROUND OF THE INVENTION

This invention relates generally to communication devices and, more particularly, to radio frequency (RF) communication devices.

RF communication systems, such as a cellular radiotelephone system, permit a user to communicate telephonically at virtually any location. Because of this unique convenience, the number of cellular telephone users has increased dramatically in recent years. While some cellular telephones are portable and, thus, can be carried on the person of the user, a cellular telephone permanently mounted within a vehicle ("mobile telephone") of the user is often considered more convenient. For example, the user of a mobile telephone, as opposed to the user of the portable telephone, does not have to be preoccupied with periodically recharging the battery coupled to the telephone or manually powering-on and powering-off the telephone. The mobile telephone is typically coupled to the battery of the vehicle and powered-on when the vehicle ignition is engaged.

Previous commercially available mobile telephones typically require a large amount of space within the passenger compartment of a vehicle. The mobile telephone includes a handset, which functions as a user-interface to perform functions and make and receive calls, and a hang-up cup for supporting the handset when it is not being utilized. The handset and hang-up cup must be placed within comfortable reach so as to be accessible to the primary occupant of the vehicle, the driver. Thus, the requisite space is further restricted to that space proximately located to the driver of the vehicle.

The degree of visibility of the handset of the mobile telephone in the passenger compartment is an additional concern. A handset mounted in proximity to the driver seat of a vehicle will typically be visible to passersby through the windows of the vehicle and, thus, inviting theft when the vehicle is left unattended. In addition, because the presence of a mobile telephone in a vehicle may often be considered a sign of affluence, the visibility of the handset may prompt unscrupulous passersby to force entry into an unattended vehicle for ulterior reasons.

A mobile telephone should also be manufactured so as to prevent the user, from diverting attention while operating the vehicle. Although Motorola, Inc. does not condone conversing on a mobile telephone while driving, an action that is unlawful in some states, it must be recognized that users may engage in such an activity. Thus, a mobile telephone should be easily operational so as to prevent the driver's eyes from "leaving the road."

Motorola, Inc. further urges users to pull off of the roadway when placing a call or immediately after receiving a call. Prior to placing a call and exiting from traffic, it would be advantageous for the driver to be able to view mobile telephone status information and judge whether the call can be made from the location of the vehicle. This prevents the user from making unnecessary multiple exits and entries into traffic when the present location is outside the coverage of a cellular system. While the vehicle is stopped, the mobile telephone should not hinder the user from making a call and remaining attentive to traffic conditions so that the user's re-entry into traffic may be quickly and safely accomplished after the call has been completed.

Manufacturers have attempted to resolve the aforementioned shortcomings in a number of ways. One such way included integrating a cellular telephone handset into the driver's side sun visor, such that a call can placed or received when the visor is in a "flipped-down" position. However, the "flipped-down" visor prevents the user from remaining attentive to traffic conditions. Another way included creating various vehicle-installed accessories that interface with the cellular telephone to eliminate the need for the handset and hang-up cup while facilitating all aspects of call initiation and termination with respect to the driver. While such accessories may appear to obviate the need for a handset by permitting the mobile telephone to function in "hands free transmit" or "voice operated transmit" modes of operation, neither of these methods suffice when the driver must assess important status information.

Therefore, it would be advantageous to provide a cost-effective RF communication device that takes up minimal space, is concealed from the view of onlookers, and permits the driver to assess status information prior to initiating a call.

DETAILED DESCRIPTION OF THE PREFERRED EMBODIMENTS

The present invention provides a radio frequency (RF) communication device that employs a mirrored surface.

Figure 1:
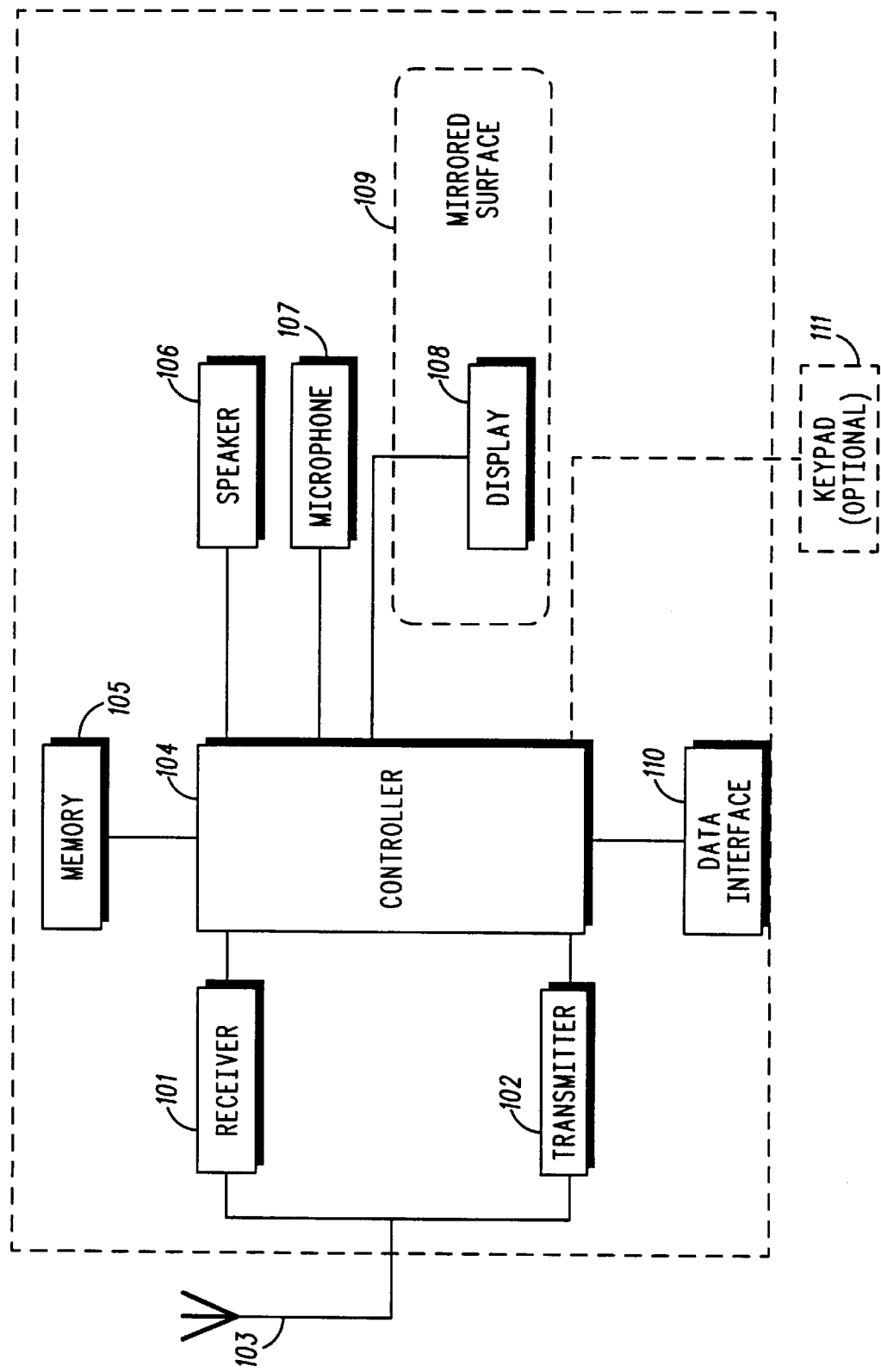
FIG. 1 is a block diagram illustrating a radio frequency (RF) communication device having a mirrored surface in accordance with the present invention.

FIG. 1 is a block diagram illustrating an RF communication device 100 having a mirrored surface 109. The RF communication device 100 consists of a receiver 101 and a transmitter 102 coupled to an antenna 103. The RF communication device 100 may be any commercial cellular radiotelephone or two-way communication device.

Coupled to both the receiver 101 and the transmitter 102 is a controller 104. The controller 104 may be comprised of any commercially available microprocessor. The controller 104 directs the operation of the receiver 101 and transmitter 102 so as to, for example, properly modulate and demodulate signals to be transmitted and received by the antenna 103.

A memory 105 is coupled to the controller 104. If the RF communication device 100 is a cellular telephone, the memory 105 may contain a series of pre-stored, preferential telephone numbers that the user may retrieve and call.

The controller 104 may provide input/output information to the user as well as to an external device or system. The input/output information may take the form of acoustic "ear and mouth" signaling to a human being. A speaker 106, coupled to the controller 104, "inputs" received, demodulated signals in an audibly discernible form into the ear of the user. While a microphone 107, coupled to the controller 104, "outputs" the speech of the user as electrical signals that are transmitted as modulated RF signals.

The input/output information can also consist of user-initiated control signaling that operates the functions of the RF communication device 100. Functional information of the RF communication device 100 may be "inputted" by the user through an interface comprised of push-buttons, switches, knobs, and/or other controls. This interface is typically embodied as a keypad 111 coupled to the controller 104. The keypad 111 may allow the user to "power-on" the RF communication device 100 as well as, in the case of a cellular telephone, permit the user to input a number to be called.

With respect to a cellular radiotelephone, the aforementioned speaker 106, the microphone 107, and the keypad 111 may be combined into a handset. The handset may be utilized by the user to input the number to call, initiate the call, converse during the call, and terminate the call. However, to facilitate operation of a cellular telephone mounted in a vehicle, the industry has begun to move towards manufacturing phones capable of operating in a "handsfree" mode.

The input/output information can further consist of operational information returned to the user during the operation of the RF communication device 100. Operational information may consist of signal strength information or status information. Operational information of the RF communication device 100 (as well as the aforementioned functional information) can be "outputted" to the viewer via a display 108. The display 108 is capable of displaying alphanumeric characters and could consist of a light-emitting diode display, a liquid crystal display, or any arrangement of visual elements that the user is capable of perceiving.

The display 108 of RF communication device 100 is coupled to a mirrored surface 109. The display 108 may be mounted behind a transparent window in the mirrored surface 109 to display functional and operational information. Alternatively, the display 108 may be positioned to project functional and operational information onto a portion of the mirrored surface 109. Current advances in electro-chromic mirror technology suggest the plausibility of controllably reducing the reflectivity of portions of the mirrored surface 109 so as to permit information presented on the display 108 mounted behind the mirrored surface 109 to be visible to a viewer on the front side of the mirrored surface 109.

The aforementioned input/output information signaling may occur via a data interface 110 coupled to the controller 104. The data interface 110 allows the RF communication device 100 to accept and return data information to and from an external system electronically, rather than audibly or visually. The external system may include a computer or other type of electronic device. Interfaces, such as the data interface 110, are also typically used during manufacture and by servicing personnel. Data passed through the data interface 110 can be used for either over-the-air communications or for controlling functionality internal to the RF communication device 100 itself. Furthermore, utilization of the data interface 110 may negate a need for the dedicated keypad 111 coupled to the controller 104.

Figure 2:
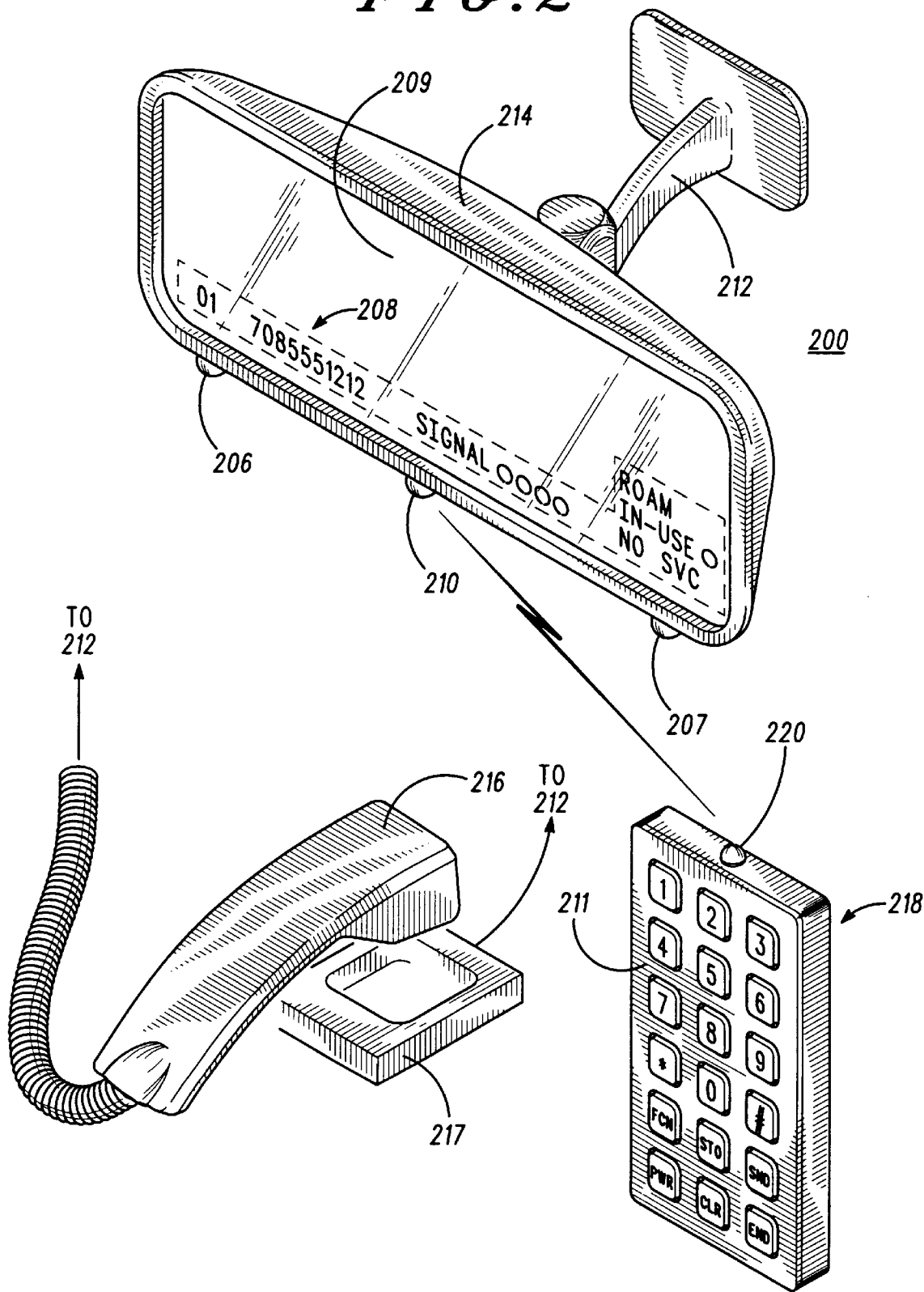
FIG. 2 illustrates a vehicle rear view mirror having an integral RF communication device in accordance with the present invention.

FIG. 2 illustrates a vehicle rear view mirror having an integral RF communication device in accordance with the present invention. For discussion purposes, the RF communication device comprising the rear view mirror is a cellular radiotelephone; thus, a rear view mirror phone 200. The rear view mirror phone 200 is comprised of a rear housing 214. A mirrored surface 209 is fitted into the rear housing 214 and comprises the front face surface of the rear housing 214. The circuitry of a cellular radiotelephone, such as that disclosed in reference to the RF communication device 100 of FIG. 1, is disposed between the mirrored surface 209 and rear face surface of the rear housing 214.

The rear view mirror phone 200 further comprises a mounting stalk 212 that extends orthogonally from the rear face surface of the rear housing 214. The stalk 212 attaches the rear view mirror phone 200 to the windshield of the vehicle, i.e., automobile. Enclosed within the stalk 212, may be cabling that both couples an antenna (similar to the antenna 103 of FIG. 1) and provides power to the circuitry within the rear housing 214. The placement of the antenna is not limited by the location of the stalk 212. The antenna may still be mounted in the most preferable location, either on the roof or on the rear window of the automobile, as cabling from the antenna to the stalk 212 can be routed along the roof of the automobile in a manner that is visually concealing.

The rear view mirror phone 200 may be conveniently powered-on when the automobile's ignition is engaged. This ensures the user of not missing a cellular call while operating the vehicle. However, should the user wish to utilize the rearview mirror phone 200 without engaging the ignition or to power-off the rear-view mirror phone 200 while the ignition is engaged, an alternate means for providing manual power-on and power-off controls may be integrated into the rear-view mirror phone 200. The alternate means may consist of touch-sensitive points on the mirrored surface 209 or separate buttons (not shown) integrated into the right and the left sides of the rear housing 214.

The rear view mirror phone 200 is configured to operate predominantly in a "handsfree" mode. The "handsfree" mode allows a user to initiate a call, converse during a call, and end a call without manipulating a handset. To facilitate the "handsfree" mode, a microphone 207, similar to the microphone 107 of FIG. 1, is integrally disposed on the bottom surface of the rear housing 214.

To further facilitate the "handsfree" mode, a speaker 206 is integrally disposed on the bottom surface of the rear housing 214. Although the speaker 206 is integral to the rear view mirror phone 200, it is plausible via cabling through the stalk 212 to utilize the factory-installed radio speakers for phone use. Upon receiving or placing a call, a switch could decouple the speakers from radio use and couple the speakers for phone use.

Displaying information to the user is also typically required when operating in a "handsfree" mode. A display, such as the display 108 of FIG. 1, can be utilized in conjunction with the mirrored surface 209. When "powered-on," information can be displayed on a very small portion, such as a display area portion 208, of the rear view mirror phone 200 in accordance with the techniques mentioned in association with FIG. 1. While information is being displayed on the small display area 208, the effectiveness of the rear view mirror as a means of permitting the user to view the area behind the vehicle is not hampered.

The information displayed by the display area 208 may consist of functional information. Functional information may include a series of pre-stored phone numbers from which a user can choose to initiate a call. As described in association with FIG. 1, the RF communication device 100 typically includes the memory 105 that may be used to store phone numbers. Such a memory is utilized in the rear view mirror phone 200 for a similar purpose. FIG. 2 reveals two series of numerals "01" and "7085551212" that occupy the left-hand portion of the display area 208. The series of numerals "01" may refer to a storage location, while the series of numerals "7085551212" may refer to a phone number stored in that storage location. The rear view mirror phone 200 may have as many as 99 such storage locations and associated phone numbers. The user may incrementally scroll through the pre-stored phone numbers by activating a touch-sensitive point on the mirrored surface 209. A suitable touch sensitive point for such incremental scrolling may be the location of the "01." Pre-stored numbers could also be accessed by a separate button or buttons (not shown) located preferably on the lower left side or the bottom left face surface of the rear housing 214.

The information displayed by the display area 208 may also consist of operational information. As previously mentioned, operational information may consist of signal strength information. FIG. 2 further shows a signal strength indicator denoted by "SIGNAL" that occupies the center portion of the display area 208. The signal strength indicator comprises a hierachial scale of visual elements located to the right of "SIGNAL" that illuminate in proportion to the proximity of a cellular base station; thus, suggesting the likelihood that a cellular call can be made from the particular location of the vehicle. The more visual elements illuminated, the greater the signal strength and the likelihood that a cellular call can be completed.

Operational information may also consist of status information. By viewing the right hand portion of the display area 208, the status of the rear view mirror phone 200, "ROAM," "IN-USE," and/or "NO SVC," may be denoted by an illuminated circular visual element. "ROAM" informs the user that the rear view mirror phone 200 is not functioning in its "home" system. "ROAM" status information is particularly vital to the user, because initiating a call outside the "home" system typically is accompanied by a large monetary fee. "IN-USE" informs the user that a call is currently in progress on the rear view mirror phone 200. "NO SVC" informs the user that a cellular call can not be placed, possibly, due to the lack of area cellular coverage or service.

The small display area 208 is strategically placed so as to allow the user/driver to effectively operate the rear view mirror phone 200 such that his or her eyes never "leave the road." By utilizing the mirrored surface 209 to display important operational information, vehicle operational safety is enhanced without adding the cost and expense of, for example, a true reverse image cathode ray tube-based, windshield reflective "heads-up" display that must, typically, be integrated into the dashboard of the vehicle.

The rear view mirror phone 200 is further equipped with hookswitch functionality for call placement and call termination. To place a call, the user would scroll through the first ten pre-stored memory locations until the desired phone number is displayed on the right hand side of the display area 208. Once the desired number is displayed, the call can be placed by activating a touch-sensitive point on the mirrored surface 209. A suitable touch-sensitive point for call placement may be the location of the phone number on the display area 208. For example, in FIG. 2, to place a call to the displayed phone number "7085551212," the user need only to touch the display area 208 of the mirrored surface 209 on which the phone number "7085551212" is displayed. An alternate means of placing a call may be to depress a button located on the rear housing 214. Call termination can best be accomplished by touching the touch-sensitive point or depressing the button a second time.

Although the "handsfree" mode tends to be extremely beneficial in assisting a cellular telephone user, there are times when the "handsfree" mode tends to be unfeasible. One such time occurs when there is a need to converse in privacy to prevent eavesdropping by other passengers in the vehicle. Excess noise from traffic or roadway construction may also prevent the user, especially if the user's vehicle is a convertible with the top down, from successfully utilizing the "handsfree" mode of the rear view mirror phone 200.

In order to resolve the aforementioned shortcomings of "handsfree" mode, an optional handset 216, equipped only with a speaker and a microphone, is coupled to the controller of the rear view mirror phone 200 within the rear housing 214 via cabling through the mounting stalk 212. The handset 216 may be used in conjunction with an optional hang-up cup 217 which is similarly coupled to the controller via the mounting stalk 212. The hang-up cup 217 is equipped for hook switch sensing and call control, such that removal of the handset 216 from the hang-up cup 217 switches the audio paths from the speaker 206 and the microphone 207 to the handset 216. The hang-up cup 217 should be mounted so as to be easily and quickly accessible to the user should the user encounter one of the aforementioned situations.

The rear view mirror phone 200 described thus far can only place calls to phone numbers that have been pre-stored in the memory. An optional infrared keypad controller 218 may be used to store phone numbers in the memory, directly input a phone number to initiate a call, as well as power-on or power-off the rear view mirror phone 100. The user accomplishes the aforementioned as well as other enhanced cellular radiotelephone features by depressing a sequence of keys located on a front face surface 211 of the keypad controller 218.

The keypad controller 218 communicates with the rear-view mirror phone 200 via infrared one-way control signals from an infrared light range light-emitting diode 207 mounted on the top surface of the keypad 218. In response to the depression of keys, infrared one-way control signals are sent by the keypad controller 218 via the infrared light-emitting diode 207 and subsequently received by an infrared light range detector 210 disposed on the bottom face of the rear housing 214 of the rear view mirror phone 200. The infrared detector 210 serves as a data interface, similar to the data interface 110 of FIG. 1, that routes received keypad control signals to the controller of the rear view mirror phone 200.

The keypad controller 218, like a standard television remote control, can be powered from self-contained dry cell batteries and only draws power when a key is depressed. For convenience, the keypad 218 can be removably attached to the dashboard or to any other location within the vehicle by means of hook and loop (i.e., Velcro) fasteners.

When used with the optional handset 216, the optional hang-up cup 217, and optional keypad controller 218, the rear view mirror phone 200 has the same functionality as the highest product tiers of mobile cellular radiotelephones. Aside from those previously mentioned, the rear view mirror phone 200 may be equipped with other high tier features such as voice recognition dialing and function control, an integrated pager, and/or an integrated answering machine.

Although FIG. 2 was discussed in reference to a cellular radiotelephone, standard two-way RF communication devices may also utilize the rear view mirror as a means of displaying information or housing circuitry. Despite some limitations due to heat sinking requirements for particular power output levels, the transmitter and receiver circuitry of two-way RF communication devices may also be housed in the rear-view mirror. Rear view mirror mounting of transmitter and receiver circuitry also allows additional room under the dash for mobile terminal usage and for the mounting of other types of accessories in vehicles used for public service, police, or taxicab applications.

Figure 3:
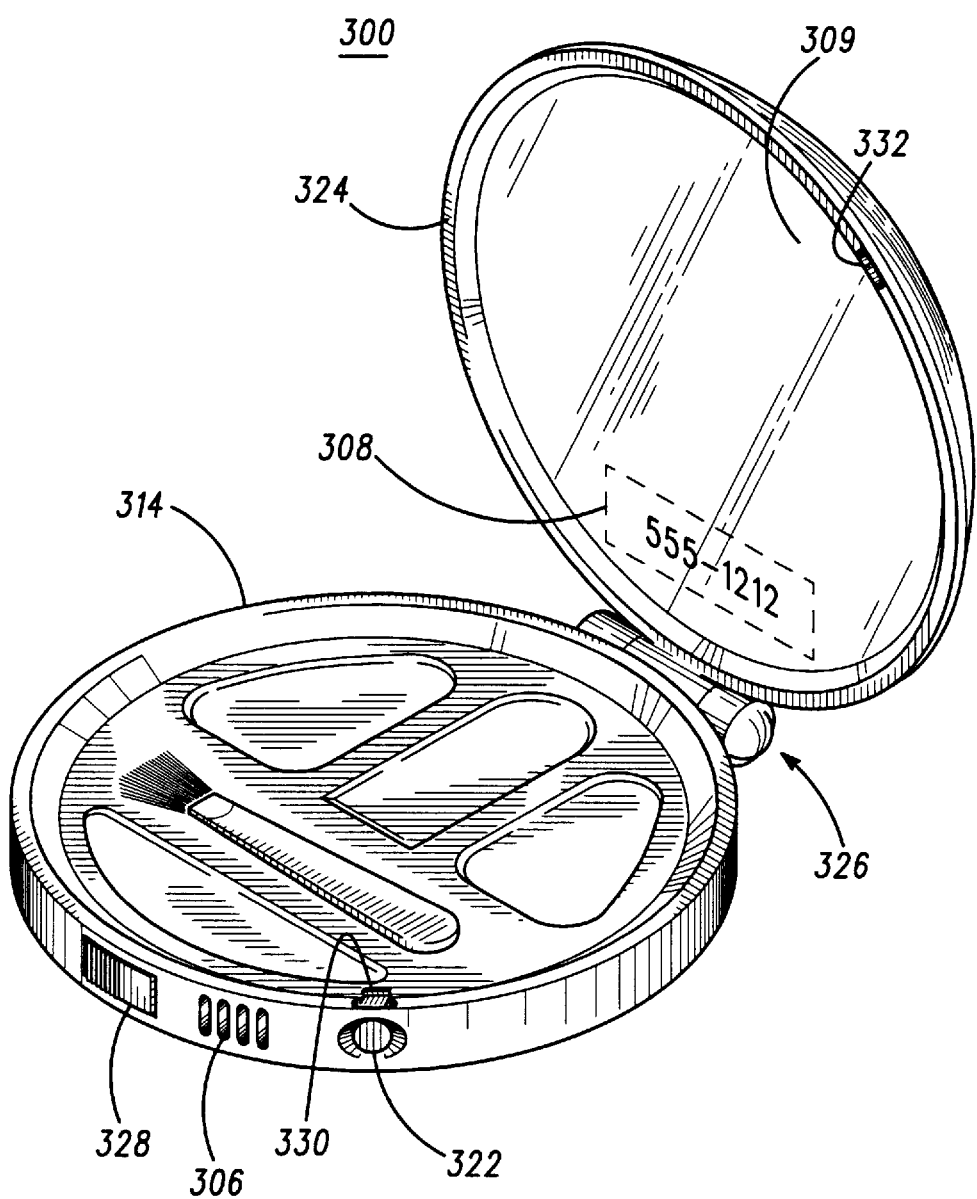
FIG. 3 illustrates a woman's make-up compact having an integral RF communication device in accordance with the present invention.

FIG. 3 illustrates a woman's make-up compact having an integral RF communication device in accordance with the present invention. The RF communication device integrated into the compact is a pager; thus, a compact pager 300. The circuitry of the compact pager 300 departs from the RF communication device 100 of FIG. 1, such that a pager is generally devoid of the transmitter 102, the microphone 107, the data interface 110, and the keypad 111 disclosed therein. Although FIG. 3 illustrates the compact pager 300, advancing technology in the area of electronics will also likely permit a "compact cellular telephone."

The compact pager 300 is comprised of a mirrored surface 309 disposed on a bottom face surface of an upper housing 324. The mirrored surface 309 includes a display area 308 that utilizes the technology as the display area 208 of the rear view mirror phone 200 of FIG. 2, discussed primarily in association with FIG. 1. Although FIG. 3 illustrates the compact pager 300, it should be realized that similar paging circuitry could be disposed in the housing of a portable mirror not comprising a compact.

The compact pager 300 is further comprised of a lower housing 314. The top face surface of the lower housing 314 may contain individualized, refillable make-up compartments and recesses for applicator instruments that are commonly associated with a woman's make-up compact. The pager circuitry, including an antenna, a receiver, and a controller, similar to those discussed in association with FIG. 1, is contained within the lower housing 314.

The upper housing 324 and the lower housing 314 are attachably coupled by a hinge 326. The hinge 326 is further comprised of a compressed spring (not shown) enclosed therein. Although FIG. 3 shows the compact pager 300 in an open state, the hinge 326 allows the compact 300 to achieve a closed state. By moving the bottom face containing the mirrored surface 309 of the upper housing 324 towards the top face surface of the lower housing 314, the compact pager 300 can be closed. While moving the upper housing 324, a force must be applied thereto so as to sufficiently overcome the spring force exhibited by the hinge 326. The closed position is accomplished when a hook member 330, extending orthogonally from the periphery of the top face surface of the lower housing 314, contacts with a ledge formed about a corresponding slot 332 disposed on the periphery of the bottom face surface of the upper housing 324.

The closed compact pager 300 can be placed in the open state shown in FIG. 3 by depressing a button 322 disposed on the side of the lower housing 314. Slidably coupled to the hook member 330, the button 322 may be depressed such that the hook member 330 is tilted and subsequently released from the ledge formed about the slot 332. Once released, the compressed spring in the hinge 326 exerts a force such that the upper housing 324 is pulled away from the lower housing 314 and achieves an upright position orthogonal to the lower housing 314. While in this opened state, the make-up and the applicator may accessed by the user and the mirrored surface 309 may be utilized to aid in make-up application. In addition, the button 322 is recessed to prevent inopportune opening while the closed compact pager 300 is, for example, being carried amongst other articles within a woman's purse or within a pocket.

The compact pager 300 may be powered-on and powered-off by a slide switch 328 mounted on the side of the lower housing 314. Like other commercially available pagers, the slide switch 328 may be positioned so as to provide an audible alert for its user when a page is received. The audible alert may emanate from a sound port 306 integrated into the side surface of the lower housing 314.

The slide switch 328 may be further positioned so as to provide a vibrate alert upon receiving a page. The vibrate alert informs the user via a series of intermittent sensorial vibrations. Such an alert may be beneficial when the user is in an environment where an audible alert is not appropriate. The vibrate alert may be produced by a small motor that revolves a shaft having an attached counter-weight. Such an apparatus is typically referred to as a vibrator (not shown) and may be adjacently mounted to the other pager circuitry and coupled to the controller of the compact pager 300.

Upon opening the closed, but powered-on, compact pager 300, maybe in response to an audible or vibrate alert, a received message is shown on the display area 308 of the mirrored surface 309. Typically, the received message, the page, consists of the phone number of the sender of the message. For example, FIG. 3 shows a page comprised of the phone number "555-1212." This page typically prompts the user to place a phone call to the phone number "555-1212."

The compact pager 300 may be configured to display the most recent page on the display area 308. In addition, the compact pager 300 may be equipped with a memory, similar to that of the memory 105 of FIG. 1, to queue and store a particular number of previously received pages. With the compact pager 300 in an opened state, the user may scroll through the stored, previously received pages by repetitively depressing the button 322. As the button 322 is repetitively depressed, the previously received pages appear in the display area 308. In addition, the display area 308 may be backlit or circumscribed with luminous elements to allow page retrieval or scrolling in dark locations.

In summary, the present invention provides an RF communication device that employs a mirrored surface. One such RF communication device includes a cellular radiotelephone integrated into the rear view mirror of a vehicle.

The rear view mirror phone may utilize the mirrored surface as a means for inputting and outputting both functional and operational information to the user, a driver of the vehicle. The user may access and select from a series of pre-stored phone numbers by activating touch sensitive spots on the mirror surface. Phone status information may be cost-effectively displayed to the user, via liquid crystal technology, on only a portion of the rear view mirror; thus, allowing the user/driver to safely obtain phone status information without ever diverting his or her eyes from the road. The mirrored surface may additionally be utilized in conjunction with two-way RF communication devices as well as pagers.

Although the present invention has been described and illustrated in the above description and drawings, it is understood that this description is by example only and that numerous changes and modifications can be made by those skilled in the art without departing from the true spirit and scope of the invention.

We claim:

1. A radio frequency (RF) communication device for operating in a RF communication system, the RF communication device comprising:

a RF receiver;

a housing; and a mirror for reflective viewing positioned in the housing, the mirror having a planar uninterrupted outer surface, a boundary defined by the housing and a transparent window, the transparent window positioned behind the outer surface and positioned within the boundary, the transparent window for projecting information associated with the RF communication system, the information comprising a phone number.

2. A radio frequency communication device in accordance with claim 1 wherein the radio frequency communication device is a pager.

3. A radio frequency communication device in accordance with claim 1 further comprising a display coupled to the RF receiver, the display disposed on a first side of the mirror and juxtaposed with the transparent window to be viewable on a second side of the mirror.

4. A radio frequency communication device in accordance with claim 3 wherein the display is an alphanumeric display.

5. A radio frequency communication device in accordance with claim 1 wherein the housing is an automobile rearview mirror assembly.

6. A radio frequency communication device in accordance with claim 1 further comprising a RF transmitter.

7. A radio frequency communication device in accordance with claim 6 wherein the radio frequency communication device is a cellular radiotelephone.

8. A radio frequency communication device in accordance with claim 6 wherein the housing further comprises a first microphone and a first speaker, the first microphone disposed on the housing and coupled to the RF transmitter, the first speaker disposed on the housing and coupled to the RF receiver, the first microphone and the first speaker defining a first audio path.

9. A radio frequency communication device in accordance with claim 8 further comprising a handset having an operational state and a non-operational state, the handset comprising a second microphone and a second speaker, the second microphone coupled to the RF transmitter, the second speaker coupled to the RF receiver, the second microphone and the second speaker defining a second audio path, the radio frequency communication device utilizing the first audio path when the handset is in the non-operational state and, alternatively, utilizing the second audio path when the handset is in the operational state.

10. A radio frequency communication device in accordance with claim 9 further comprising a hang-up cup, the hang-up cup being detachably coupled to at least a portion of the handset and having a detector, the detector to detect attachment of the handset and to indicate that the handset is in the non-operational state when coupled to the hang-up cup and, alternatively, that the handset is in the operational state when detached from the hang-up cup.

11. A radio frequency communication device in accordance with claim 6 further comprising a memory coupled to the RF transmitter to store functional information.

12. A radio frequency communication device in accordance with claim 11 wherein functional information read from the memory is viewable via the transparent window.

13. A radio frequency communication device in accordance with claim 11 wherein the mirrored surface further comprises a touch sensitive area being actuatable to select viewable functional information.

14. A radio frequency communication device in accordance with claim 1 wherein the information is received by the RF receiver.

15. A radio frequency communication device in accordance with claim 6 wherein the information further comprises roaming status information received by the RF receiver.

16. A radio frequency communication device in accordance with claim 6 wherein the information further comprises signal strength information received by the RF receiver.

17. A radio frequency communication device in accordance with claim 6 further comprising a wireless controller comprising a keypad and a wireless transmitter, the keypad being actuatable to generate functional information, the wireless transmitter, responsive to actuation of the keypad, to couple the functional information to the RF transmitter for transmission.

18. A radio frequency (RF) communication device for operating in a RF communication system, the RF communication device comprising:

a RF transceiver to communicate with the RF communication system;

a rear view mirror housing;

a display coupled to the RF transceiver to display information associated with the RF communication system, the information comprising a telephone number, roaming status information and signal strength information; and a mirror attached to the rear view mirror housing, the mirror being substantially rectangular and defined by longitudinal and transverse axes, the mirror having a planar uninterrupted outer surface and a boundary defined by the rear view mirror housing, the outer surface separated into a display area and a mirrored area, the display area and the mirrored area positioned within the boundary, the display area coupled to the display, the display area being substantially rectangular and defined by longitudinal and transverse axes, the display area further positioned such that the longitudinal axis of the display area is parallel to the longitudinal axis of the mirror to facilitate viewing of the information, the mirrored area to provide rearward reflective viewing, the display area positioned along a lower half of the outer surface to permit viewing of the information and rearward reflective viewing substantially simultaneously.

* * * * *